(12) United States Patent
Oura et al.

(10) Patent No.: US 6,507,483 B2
(45) Date of Patent: Jan. 14, 2003

(54) KEYBOARD DEVICE WITH PALMREST STORED THEREIN

(75) Inventors: Nobuhiro Oura, Fukushima-ken (JP); Akio Nishijima, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 47 days.

(21) Appl. No.: 09/814,613

(22) Filed: Mar. 22, 2001

(65) Prior Publication Data

US 2001/0028548 A1 Oct. 11, 2001

(30) Foreign Application Priority Data

Apr. 6, 2000 (JP) ........................................ 2000-104374

(51) Int. Cl.[7] ................................................ G06F 1/16
(52) U.S. Cl. .................... 361/680; 400/715; 248/118.3; 248/918
(58) Field of Search ................................ 361/683, 680; 364/708.2; 248/118, 118.1, 118.3, 118.5, 455, 456, 918; 400/715; G06F 1/16

(56) References Cited

U.S. PATENT DOCUMENTS

| | | | | |
|---|---|---|---|---|
| 5,570,268 A | * | 10/1996 | Selker | ........................ 361/680 |
| 5,754,395 A | * | 5/1998 | Hsu et al. | .................... 361/680 |
| 5,818,360 A | * | 10/1998 | Chu et al. | ................. 248/118.3 |
| 5,841,631 A | * | 11/1998 | Shin et al. | .................... 361/683 |
| 6,025,986 A | | 2/2000 | Sternglass et al. | |

* cited by examiner

Primary Examiner—Darren Schuberg
Assistant Examiner—Anthony Q. Edwards
(74) Attorney, Agent, or Firm—Brinks Hofer Gilson & Lione

(57) ABSTRACT

In order to provide a keyboard device in which a pad used as a palmrest can be stored in the main body, a lock member and an operating segment are integrally formed by a resin resilient member. An engaging segment is formed at the extremity end of a resilient piece constituting a part of the resilient member, the engaging segment is inserted into an engaging hole formed at the pad and it is locked with the pad stored in a notch. Releasing of the locked state is performed such that the resilient member is resiliently deformed while the operating segment is pressed and then the engaged state between the engaging segment and the engaging hole is released. As a locked state releasing means, the resilient piece is provided with a small projecting piece, the main body is provided with a small protrusion, the engaging segment is resiliently deformed in a direction moving away from the engaging hole against the resilient piece by movement of the small projecting piece and the small protrusion while they are being abutted to each other.

12 Claims, 4 Drawing Sheets

KEYBOARD DEVICE WITH PALMREST STORED THEREIN

BACKGROUND OF THE INVENTION

1. Field of the Invention

This invention relates to a keyboard device which is used as a data input device for a computer, and more particularly, a keyboard device having a palmrest stored therein.

2. Description of the Related Art

In the keyboard device used in a desk-top type computer, the computer main body and the keyboard device are constituted of separate members. In the case of such a keyboard device, the operation keys (key tops) substantially protruded out are present on the main body in general, so that when an operator puts the keyboard device on a desk to operate the computer, a substantial gap is produced between the upper ends of the operation keys and the desk. Due to this fact, the operator must operate the keyboard with the operator's hands always staying over the keyboard, resulting in a heavy burden for key operation.

In view of this fact, in order to reduce an operator's burden for key inputting operation, the operator purchases a palmrest separately sold, arranges the palmrest before the keyboard device and performs the key operation while the operator's palms are being placed on it, thereby the operator can reduce the burden on the hands.

However, the prior art keyboard device described above had some problems indicated as follows.

That is, there occurred a case in which the keyboard device separately sold required extra space when the palmrest was stored, and when the palmrest was moved together with the keyboard device, its motion was inconvenient, and further the keyboard device did not show a uniform height of the step for every type, but had different heights and so the palmrest separately sold could not be used at its most appropriate height Further, a certain keyboard device was provided with a palmrest in advance that was removably installed there and this device had an advantage that an operator used it at its most appropriate height due to its exclusive manufacturing for the operator, although both fixing and removal of the palmrest at the time of its need and at the time of its non-necessity were troublesome and if the operator tried to transport it while it was fixed to the keyboard under the operator's unusual attitude, there was a possibility that the connected part between the keyboard device and the palmrest was damaged. In addition, it showed a problem that it required extra space for keeping the palmrest when the palmrest was not used.

SUMMARY OF THE INVENTION

The present invention has been invented to solve the aforesaid problem and it is an object of the present invention to provide a keyboard device not requiring any extra space for storing the palmrest, capable of being always used at the most appropriate height and being easily transported with the palmrest fixed to the keyboard.

The present invention provides a keyboard device in which a main body having operation keys arranged on its front surface side and a pad used as a palmrest are integrally arranged, wherein the rear side of the main body is formed with a notch segment and the pad can be stored in the notch.

As described above, when it is not necessary to use the palmrest, the palmrest can be stored at the rear side of the main body, so that it is not necessary to keep any extra space in advance for storing the palmrest and so the space around the keyboard can be effectively utilized.

In addition, in the case of the present invention, the pad is provided with an arm which is turned around a predetermined position of the main body as a fulcrum point and the arm is arranged at an operator's side of the main body while turning around the rear side of the main body together with the pad.

A changing-over between the operation for taking-out the pad and the operation for storing the pad can be carried out by merely lifting up the main body and turning it and further it can be performed rapidly and easily. In addition, since this is exclusively used for operation, it can always be used at the most appropriate height position and it may not be dropped off during transportation of the keyboard and it is convenient for transportation.

Further, it is preferable in the present invention that both pad and arm are stored in the notch.

Even if the key operation is carried out with the pad stored in the notch by the aforesaid means, looseness of the main body is prevented and the key operation can be performed securely.

Further, it is preferable in the present invention that a lock means locked when the pad is stored in the notch and the operating segment operated when the lock is released are integrally formed at the main body by a resilient member having a resilient force, the lock means is provided with an engaging segment for engaging with the pad when locked, and when the operating segment is operated in a direction releasing the locked state, the resilient member is resiliently deformed in a direction in which the engaging segment is moved away from the pad.

Since the entire resilient member can be integrally molded by resin by the aforesaid means, its cost can be reduced In addition, it is preferable in the present invention that the pad is provided with an engaging hole engaged with the engaging segment at a position opposing against the engaging segment when the pad is stored in the notch. With such an arrangement, the pad is securely held at the rear side of the main body.

Further, it is preferable in the present invention that the resilient member and/or the main body is provided with a locked state releasing means for moving it in a direction where the engaging segment is pulled out of the engaging hole when the operating segment is operated in a direction for releasing the locked state.

For example, each of the protrusions has only to be arranged at the position where the main body and the resilient member are abutted to each other when the operating segment is operated in a lock releasing direction. With such an arrangement, when the lock releasing operation is once carried out, each of the protrusions is abutted and the resilient member is resiliently deformed, the engaging segment is moved in a direction moving away from the engaging hole so as to cause the locked state between the engaging segment and the pad to be released.

In addition, after the locked state is released, it is resiliently recovered back by a resilient force provided by the resilient member itself.

PREFERRED EMBODIMENT OF THE INVENTION

Figure 1:
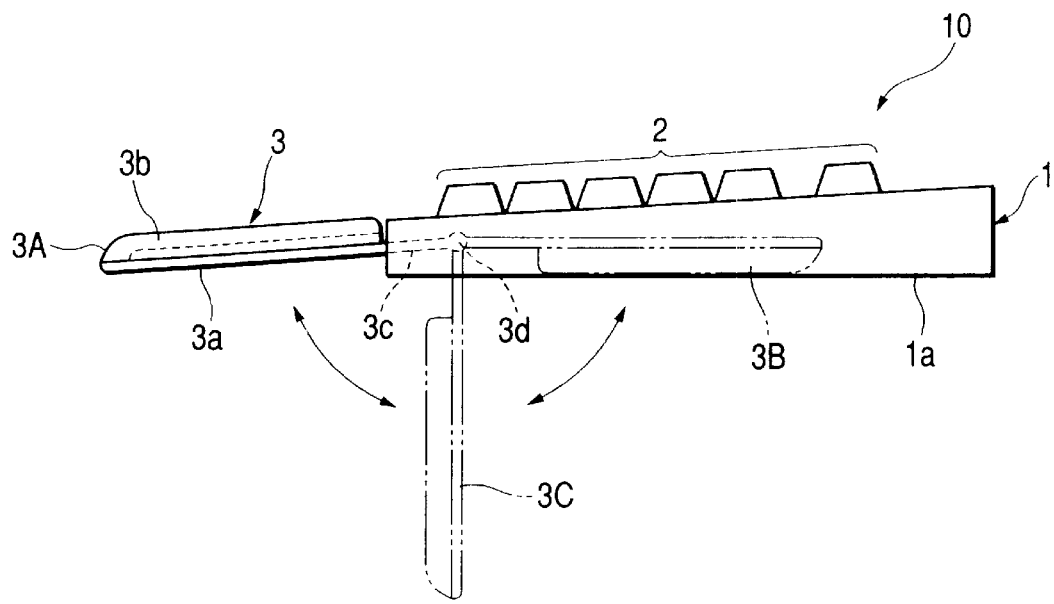
FIG. 1 is a top plan view for showing the keyboard device of the present invention as viewed from the side surface of it.
Figure 2:
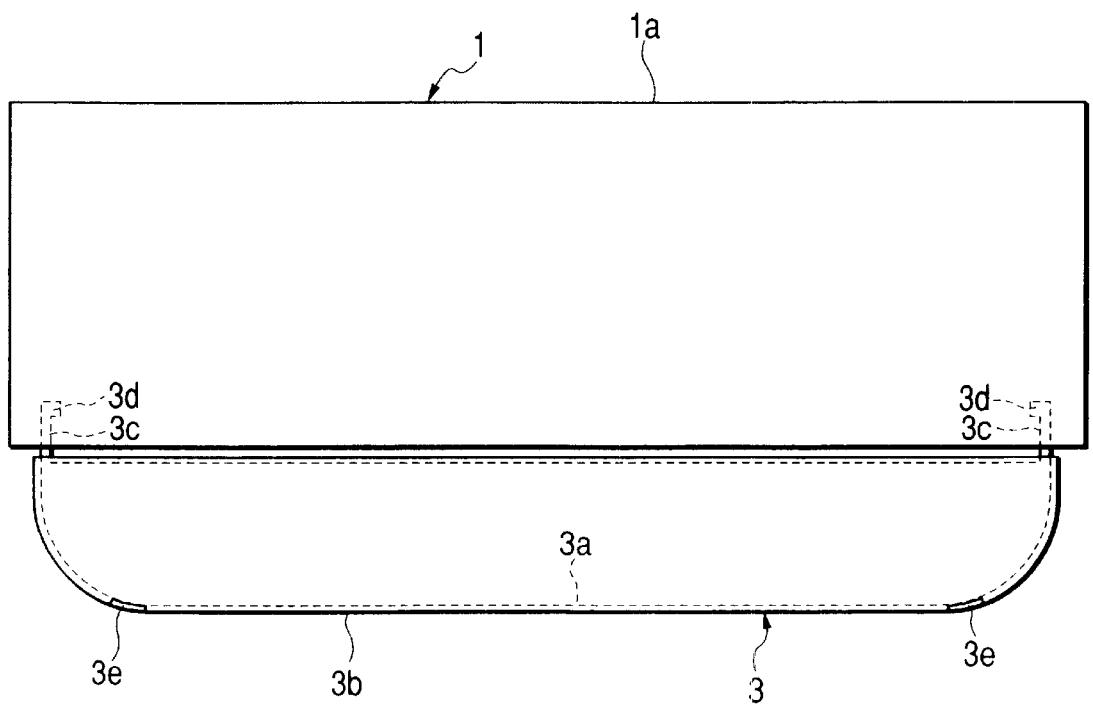
FIG. 2 is a top plan view for showing the keyboard device of the present invention as viewed from the upper surface of it.
Figure 3:
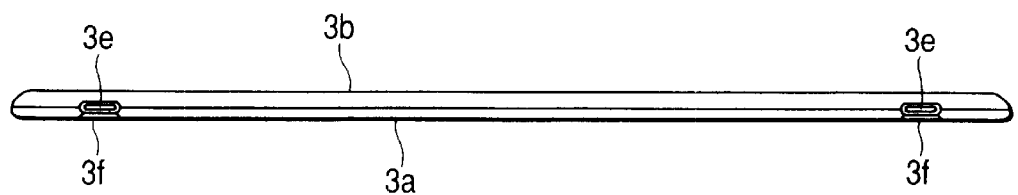
FIG. 3 is a top plan view for showing a pad as viewed from its front surface side.
Figure 4:
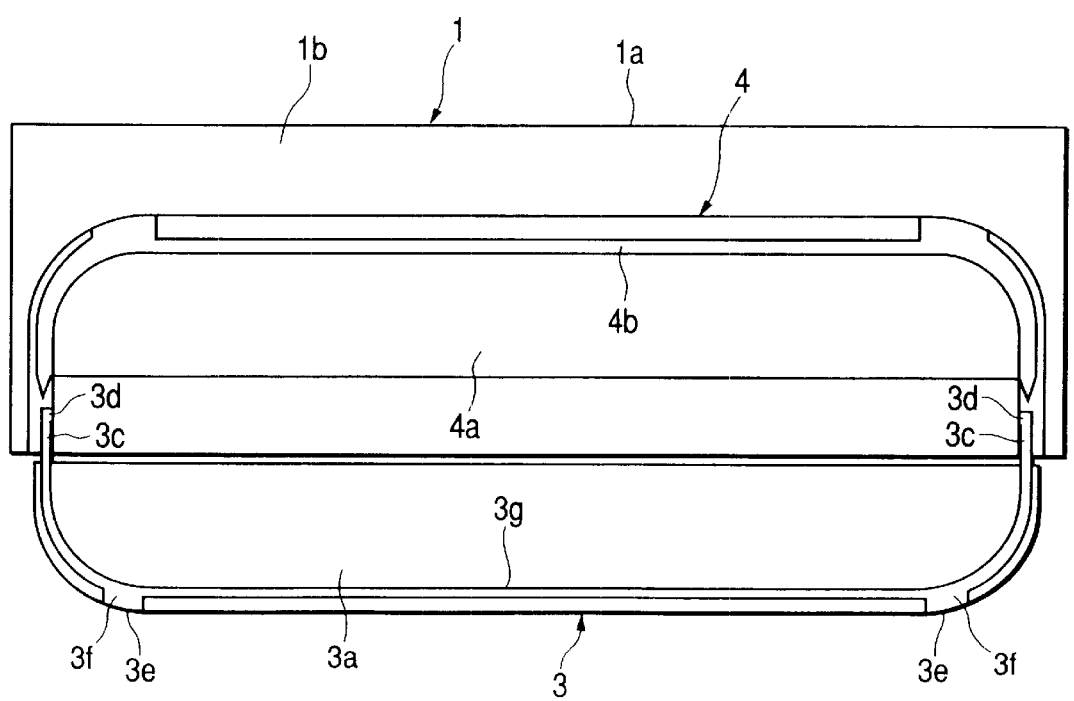
FIG. 4 is a top plan view for showing a rear side of the keyboard device of the present invention.
Figure 5:
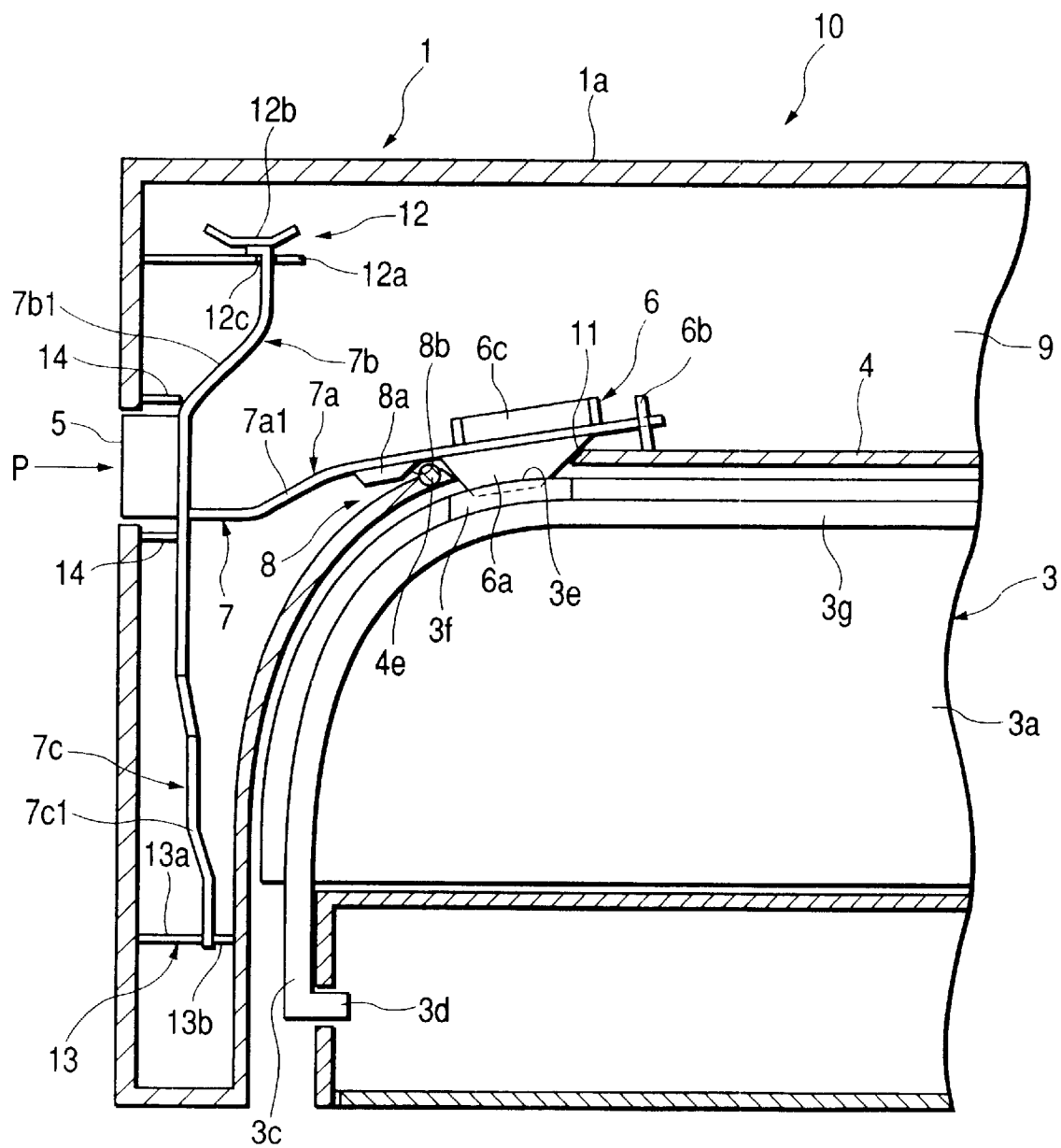
FIG. 5 is a top plan view for showing a locked state of the pad in the keyboard device of the present invention.
Figure 6:
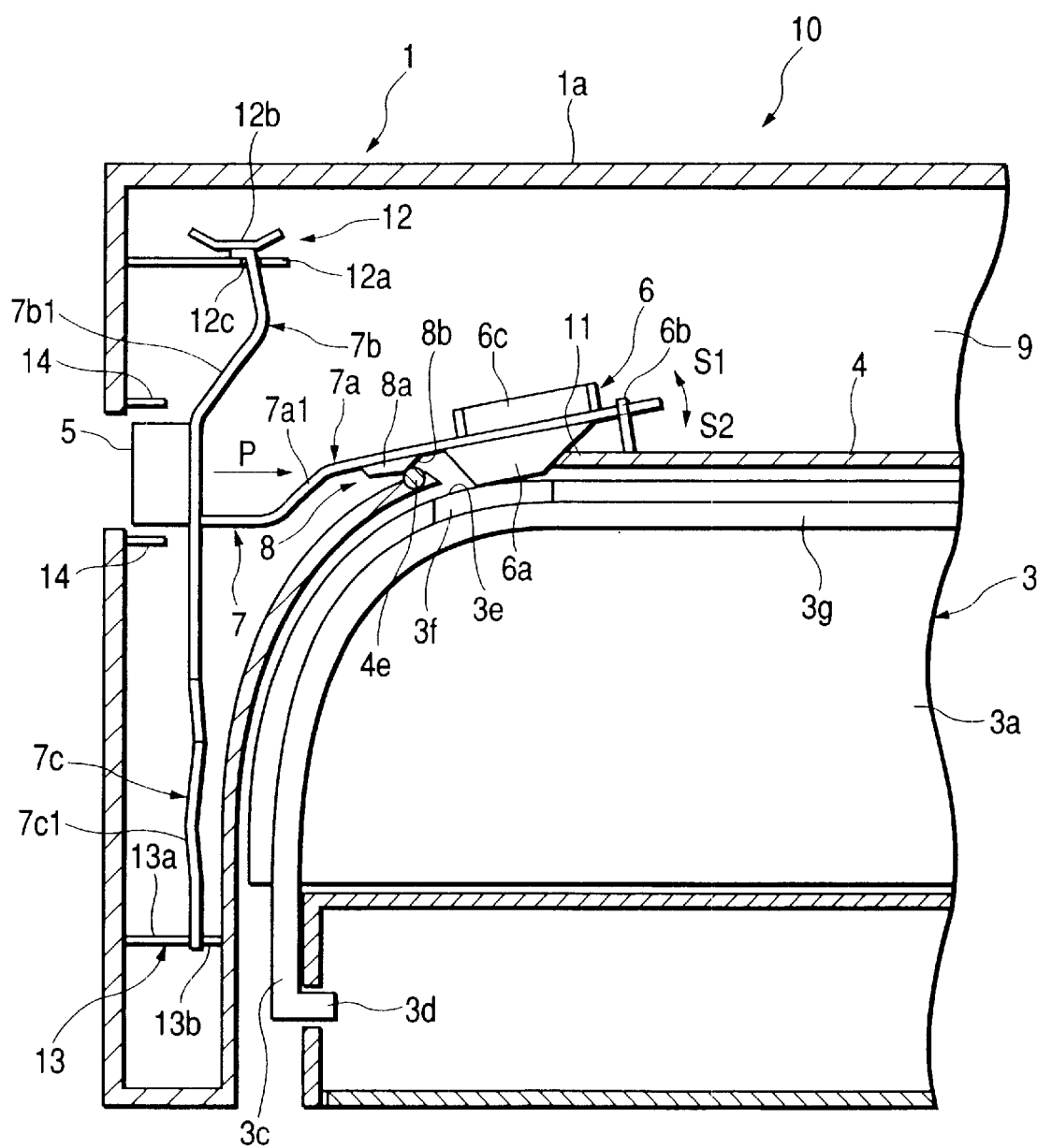
FIG. 6 is a top plan view for showing an unlocked state of the pad in the keyboard device of the present invention.

Referring now to FIGS. 1 to 6, the keyboard device of the present invention will be described as follows. FIG. 1 is a top plan view for showing the keyboard device of the present invention as viewed from the side surface of it, FIG. 2 is a top plan view for showing the keyboard device of the present invention as viewed from the upper surface of it, FIG. 3 is a top plan view for showing a pad as viewed from its front surface side, FIG. 4 is a top plan view for showing a rear side of the keyboard device of the present invention, FIG. 5 is a top plan view for showing a locked state of the pad in the keyboard device of the present invention and FIG. 6 is a top plan view for showing an unlocked state of the pad in the keyboard device of the present invention.

As shown in FIG. 1, a main body 1, operation keys 2 and a pad 3 constitute the keyboard device 10 of the present invention.

The main body 1 is formed of a rectangular case 1a formed of resin and the like.

The operation keys 2 are arranged such that a plurality of keys (key tops) formed by resin are installed under a predetermined standard.

The pad 3, which is usually a part called palmrest, consists of a base member 3a formed of resin and the like, a cover member 3b and arms 3c, 3c.

The base member 3a is formed of resin and the like into a plate-like member, and as shown in FIG. 2, it is formed into an elongated shape along a longitudinal direction (the lateral direction) of the main body 1. The base member 3a is provided with the cover member 3b at its upper surface. The cover member 3b is provided with a member molded by resin of silicone system or a member having a cushion characteristic. The base member 3a and the cover member 3b may be integrally formed. Both ends of the base member 3a are formed with the arms 3c, 3c which are protruded in a direction substantially crossing with the longitudinal direction of the pad 3 at a right angle. Further, the turning shafts 3d, 3d are protruded inwardly and formed at the extremity ends of the arms 3c, 3c, respectively, and the turning shafts 3d, 3d are rotatably supported at the main body 1 and the pad 3 can be turned in respect to the main body 1.

As shown in FIG. 3, the base member 3a is formed with engaging holes 3e, 3e at both front ends, and the lower sides of the engaging holes 3e, 3e are formed with tapers 3f, 3f.

Further, as shown in FIG. 4, at the rear side of the base member 3a, the protrusion 3g is integrally formed in an arch-like manner along the shape of the circumferential edge of the base member 3a from one arm 3c to the other arm 3c. In addition, the protrusion 3g is formed to be protruded from the flat surface of the base member 3a in a semi-circular shape, and the tapers 3f, 3f are also formed to be protruded from the flat surface of the base member 3a together with the protrusion 3g.

The main body 1 is formed with a notch 4 at its rear surface 1b. As shown in FIG. 4, this notch 4 is constituted of the first notch 4a and the second notch 4b. The first notch 4a is a part where the flat surface of the base member 3a is abutted against the surface. The second notch 4b is formed such that a depth size from the rear surface 1b is formed to be larger than that of the first notch 4a, wherein its size is set such that the arms 3c, 3c, the protrusion 3g and the tapers 3f, 3f are stored in it. Under this arrangement, the pad 3 is stored in it without protruding out of the rear surface 1b of the main body 1.

In the aforesaid keyboard device 10, when the pad 3 is not required, it is possible to store the pad 3 in the main body 1, and when required, it is taken out of within the main body 1 and arranged at the operator's side in front of the main body 1. That is, as shown in FIG. 1, the state of pad 3 (3A) shown by a solid line is kept at the state where it can be used, the state of the pad 3 (3B) shown by a one-dotted line in which it is stored in the main body 1, and a state of the pad 3(3C) indicated by a two-dotted line is a state in which the pad is set during its changing-over operation. As described above, the pad 3 is rotatably supported around a fulcrum point of each of the rotating shafts 3d, 3d and it may be turned through the rear side of the main body 1.

Then, referring to FIGS. 5 and 6, the lock means for the pad 3 against the main body 1 in the keyboard device 10 and the unlocking means will be described. In the following description, only one half side of the keyboard device 10 is indicated and the other half side is merely formed symmetrically to that shown in FIGS. 5 and 6, its shape and operation are exactly the same and its description will be eliminated.

As shown in FIG. 5, the lock member 6 acting as a lock means and the operating segment 5 are integrally formed with the resilient member 7 at the main body 1. The lock member 6, the operating member 5 and the resilient member 7 are all integrally molded by resin and the like.

The resilient member 7 is comprised of a resilient piece 7a extending in a longitudinal direction of the main body 1, and the base end of the resilient piece 7a is provided with a resilient piece 7b and a resilient piece 7c substantially crossing at a right angle with the resilient piece 7a.

The resilient piece 7a is of a thin-plate form and the extremity end of the resilient piece 7a is provided with the lock member 6. This lock member 6 is comprised of a trapezoidal piece-like engaging segment 6a protruded toward the pad 3. The back surface of the engaging segment 6a is formed with the guide member 6c. The guide member 6c can be slid in regard to the inner bottom surface 9 of the main body 1, thereby the resilient piece 7a is prevented from being inclined and any trouble at the time of locked state is prevented.

The engaging segment 6a is formed at the position opposing against the engaging hole 3e of the pad 3 when the pad 3 is stored in the main body 1. At the aforesaid position, the notch 4 is formed with an insertion hole 11 in such a way that the engaging segment 6a and the engaging hole 3e can be engaged to each other.

The extremity end of the resilient piece 7a is provided with a gate-shaped guide piece 6b integrally formed with the bottom surface 9 of the main body 1. The inner frame of the guide piece 6b has an opening with a size in which the resilient piece 7a can be swung by a predetermined amount. In addition, the resilient piece 7a is prevented from being disengaged from the main body 1 by the guide piece 6b.

The resilient piece 7b is of a thin-plate shape, and the extremity end of the resilient piece 7b is bent into an L-shape. Its extremity end is formed with the holding member 12 integrally formed with the main body 1. The holding member 12 is comprised of thin plate-like holding pieces 12a, 12b, the holding piece 12a is formed with a slit 12c, the extremity end of the resilient piece 7b is inserted into this slit 12c, and then the L-shaped segment of the resilient piece 7b is held by the holding piece 12a and the holding piece 12b. The width of the slit 12c is approximately the same as the width of the resilient piece 7b and the holding member 12 positively holds the extremity end of the resilient piece 7b without any looseness at all.

The resilient piece 7c is of a thin plate-like form and the extremity end of the resilient piece 7c is formed with an engaging member 13 integrally formed with the main body 1. The engaging member 13 is comprised of engaging pieces 13a, 13b, the engaging piece 13a is formed at the same height as the extremity lower end of the resilient piece 7c, and the resilient piece 7c can be slid on the upper end of the engaging piece 13a. The engaging piece 13b is formed to have a height size larger than that of the engaging piece 13a near the pad 3 and the side surface of the engaging piece 13b is abutted against the side surface of the resilient piece 7c.

The aforesaid resilient pieces 7a, 7b and 7c are formed with bent segments 7a1, 7b1 and 7c1 at their midway part The aforesaid bent segment 7a1 having the shape shown in FIG. 5 can generate a resilient returning force toward the pad 3. In addition, the bent segment 7b1 having the shape as shown in the figure may generate the resilient returning force toward the direction opposite to P when the operating segment 5 is pressed in the direction of arrow P. Also the bent segment 7c1 having the shape shown also generates the resilient returning force in the direction opposite to that of P in the same manner as described above.

In addition, both the extremity end of the resilient piece 7a and the extremity end of the resilient piece 7c are formed to have a lower height size (finer) than that of the base end in such a way that they may be resiliently deformed.

The operating segment 5 is operated when the locked state of the pad 3 is released and this is formed into a column-like shape. This operating segment 5 is arranged to be protruded out of the side surface of the main body 1 and formed to be slightly near the resilient piece 7b than the base end of the resilient piece 7a. In addition, the main body 1 is integrally formed with the stoppers 14, 14 protruded at both sides of the operating segment 5 toward the resilient pieces 7b, 7c, thereby the surface of the operating segment 5 is kept on the same surface as the outer surface of the main body 1 other than the case that the locked state is released.

In addition, the keyboard device 10 is provided with a locked state releasing member 8 acting as a locked state releasing means.

A small projecting piece 8a and a small protrusion 4e constitute the locked state releasing member 8. The small projecting piece 8a is arranged at the resilient piece 7a and is formed as a trapezoidal piece at the base end of the engaging segment 6a and protruded toward the pad 3. In addition, the small protruding piece 8a has a tapered portion 8b at the extremity end of the resilient piece 7a. In turn, the small protrusion 4e is arranged inside the main body 1, forms a column-like shape between the small protruding piece 8a and the engaging segment 6a and also near the small protruding piece 8a and is integrally formed with the main body 1.

Next, operations of the lock means for the pad 3 and the locked state releasing means will be described.

The keyboard device 10 shown in FIG. 5 is kept at a state in which the pad 3 is stored at the rear side of the main body 1 and locked there. Under this state, the extremity end of the engaging segment 6a is inserted into the engaging hole 3e of the pad 3 and locked there so as to prevent the pad 3 from being sprung out of the main body 1. At this time, the resilient piece 7a is kept at a state in which it is biased toward the pad 3 by a resilient force of its own, and the pad 3 is positively engaged by the engaging segment 6a. In addition, the resilient piece 7c is kept with the extremity end abutted against the engaging piece 13a. Further, the surface of the operating segment 5 is held in such a way that it may be positioned at the same surface as the outer surface of the main body 1.

In the state shown in FIG. 5, when the operating segment 5 is pressed by a finger toward a direction of an arrow P, the operating segment 5 is pushed into the main body 1 with this pressing force. At this time, at the resilient member 7, the resilient piece 7b and the resilient piece 7c are resiliently deformed in the direction P against the biasing force of their own resilient force and the resilient piece 7a is also moved in the direction P. Further, when the resilient piece 7a is moved under operation of the operating segment 5 toward the extremity end of the resilient piece 7a, the small protruding piece 8a is also concurrently moved in the same direction. At this time, the small protrusion 4e is abutted against the tapered portion 8b of the small protruding piece 8a and the small protrusion 4e is slid from the lower end to the upper end of the taper 8b, thereby the engaging segment 6a is moved such that the resilient piece 7a is being resiliently deformed toward the direction S1, the engaged state between the engaging segment 6a and the engaging hole 3e is released and the locked state of the pad 3 is released (refer to FIG. 6). Since the extremity end of the resilient piece 7a is held by the guide piece 6b, it does not move more than a predetermined amount and the position of the engaging segment 6a in its height direction is not changed and the resilient piece 7a is not removed from the main body 1.

Then, as the locked state of the pad 3 is released, the pad 3 is turned around the rotating shaft 3d as a fulcrum. Further, the pad 3 passes through the rear side of the main body 1 and is turned to the location before the main body 1.

When the finger or the like operating the operating segment 5 is moved away from it and the operating segment 5 is released, each of the resilient pieces 7b, 7c is resiliently returned in a direction opposite to the direction P. In addition, the resilient piece 7a is operated such that the small protruding piece 8a slides from the upper end to the lower end of the taper 8b while it is pressing against the small protrusion 4e by its own resilient force, the resilient piece 7a is resiliently returned in the direction of the arrow S2. In addition, the operating segment 5 is engaged at the position where the resilient pieces 7b, 7c are engaged with the stoppers 14, 14 and the operating segment 5 is in flush with the side surface of the main body 1.

In the case where the pad 3 is locked from the aforesaid state, the pad 3 is passed through the rear side of the main body 1 with the rotating shaft 3d being applied as a fulcrum point and it is turned up to the notch 4. When the pad 3 is stored in the notch 4, the taper 3f of the base member 3a and the engaging segment 6a are abutted to each other. Further, the pad 3 is pressed toward the notch 4, the engaging segment 6a slides along the taper 3f and at the same time it moves in the direction S1 (refer to FIG. 6) under a resilient deformation of the resilient piece 7a. Then, as the engaging segment 6a rides over the taper 3f, the engaging segment 6a is resiliently returned in the direction S2 with the resilient returning force of the resilient piece 7a and inserted into the engaging hole 3e. With such an arrangement as above, the pad 3 is positively locked in the notch 4 at the rear side of the main body 1.

The keyboard device of the present invention is not limited to the aforesaid shape, but it is satisfactory if the device can control the motion of the engaging segment 6a toward the locked state and the motion toward the locked state releasing direction.

In addition, the locked state releasing member 8 may be set such that the small protruding piece 8a is positioned toward either the extremity end side or the base end side than the aforesaid position of the resilient piece 7a and further the position of the small protrusion 4e can be properly changed in response to the position of the small projecting piece 8a. Further, it may also be applicable that the extremity end of the resilient piece 7a is provided with a tapered member.

Since the locked state of the pad and the unlocked state of the pad can be carried out with the resilient force found in the resin in accordance with the present invention, it is not necessary to arrange a separate resilient member and it can be manufactured in less-expensive manner in view of its cost.

Further, the pad can be stored in the main body, so that when the pad is not needed, it does not require any surplus space for storing the pad and a space around the keyboard can be effectively utilized.

Additionally, since the pad is supported by the main body, the pad is not dropped off from the main body and its carrying may easily be performed.

What is claimed is:

1. A keyboard device comprising a main body having operation keys arranged on a front surface side and a pad used as a palmrest integrally arranged with the main body, wherein a rear side of the main body is formed with a notch and the pad can be stored in the notch, the pad is provided with an arm turned around a predetermined position of the main body as a fulcrum point, and the arm is arranged at an operator's side of the main body while turning around the rear side of the main body together with the pad.

2. A keyboard device according to claim 1 in which the pad and the arm are stored in the notch.

3. A keyboard device according to claim 1 in which a lock means locked when the pad is stored in the notch and an operating segment operated when a locked state is released are integrally formed at the main body with a resilient member having a resilient force, the lock means is provided with an engaging segment for engaging with the pad when locked, and when the operating segment is resiliently operated in a direction releasing the locked state, the resilient member is deformed in a direction in which the engaging segment is moved away from the pad.

4. A keyboard device according to claim 3 in which the pad is provided with an engaging hole engaged with the engaging segment at a position opposing against the engaging segment when the pad is stored in the notch.

5. A keyboard device according to claim 4 in which the resilient member is provided with a locked state releasing means for moving the resilient member in a direction where the engaging segment is taken out of the engaging hole when the operating segment is operated in the direction for releasing the locked state.

6. A keyboard device according to claim 5 in which the main body is provided with another locked state releasing means for moving the resilient member in the direction where the engaging segment is taken out of the engaging hole when the operating segment is operated in the direction for releasing the locked state.

7. A keyboard device according to claim 4 in which the main body is provided with a locked state releasing means for moving the resilient member in a direction where the engaging segment is taken out of the engaging hole when the operating segment is operated in the direction for releasing the locked state.

8. A keyboard device comprising a main body having operation keys arranged on a front surface side and a pad used as a palmrest integrally arranged with the main body, wherein a rear side of the main body is formed with a notch, the pad can be stored in the notch, a lock means locked when the pad is stored in the notch and an operating segment operated when a locked state is released are integrally formed at the main body with a resilient member having a resilient force, the lock means is provided with an engaging segment for engaging with the pad when locked, when the operating segment is resiliently operated in a direction releasing the locked state, the resilient member is deformed in a direction in which the engaging segment is moved away from the pad, and the pad is provided with an engaging hole engaged with the engaging segment at a position opposing against the engaging segment when the pad is stored in the notch.

9. A keyboard device according to claim 8, wherein the pad is provided with an arm turned around a predetermined position of the main body as a fulcrum point, and the arm is arranged at an operator's side of the main body while turning around the rear side of the main body together with the pad, and the pad and the arm are stored in the notch.

10. A keyboard device according to claim 9, wherein the resilient member is provided with a locked state releasing means for moving the resilient member in a direction where the engaging segment is taken out of the engaging hole when the operating segment is operated in the direction for releasing the locked state.

11. A keyboard device according to claim 10, wherein the main body is provided with another locked state releasing means for moving the resilient member in the direction where the engaging segment is taken out of the engaging hole when the operating segment is operated in the direction for releasing the locked state.

12. A keyboard device according to claim 9, wherein the main body is provided with a locked state releasing means for moving the resilient member in a direction where the engaging segment is taken out of the engaging hole when the operating segment is operated in the direction for releasing the locked state.

* * * * *